Feb. 4, 1947. J. G. KREYER 2,415,291
MOLD FOR TRACTOR TIRES
Original Filed March 12, 1945 4 Sheets-Sheet 1

INVENTOR
JOHN G. KREYER, DECEASED
BY HELEN E. KREYER, EXECUTRIX
BY Ely & Frye
ATTORNEYS

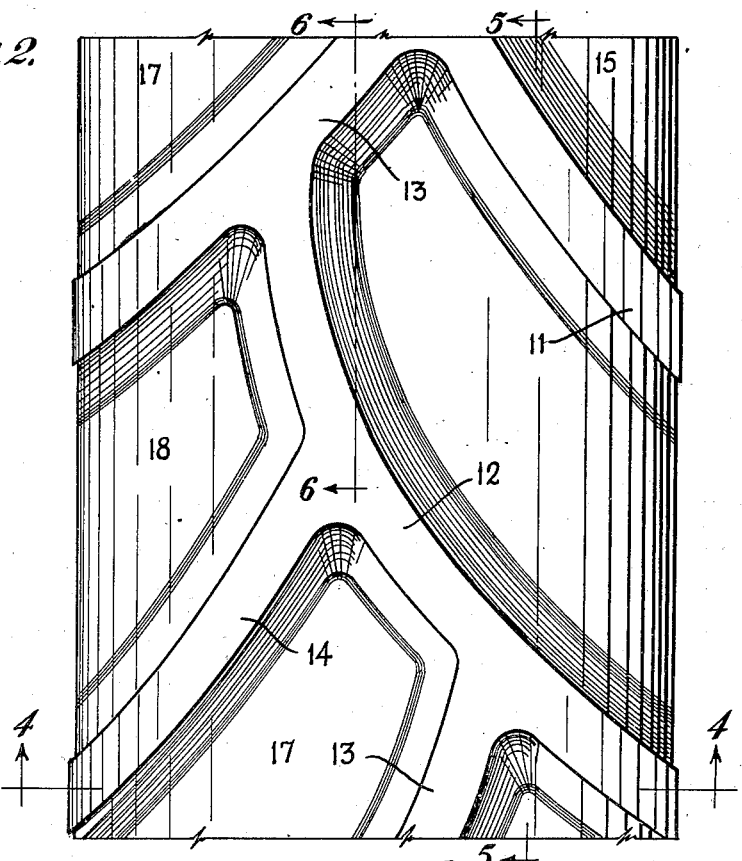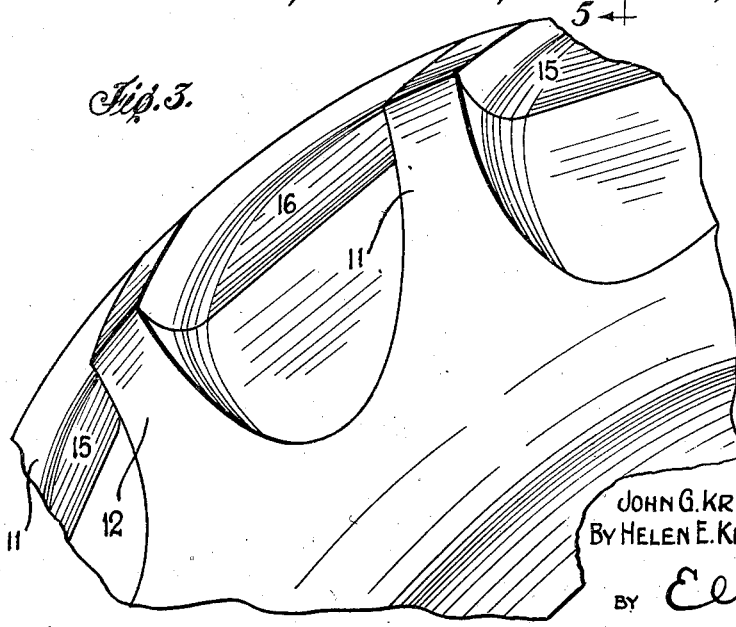

Feb. 4, 1947.  J. G. KREYER  2,415,291
MOLD FOR TRACTOR TIRES
Original Filed March 12, 1945    4 Sheets-Sheet 3
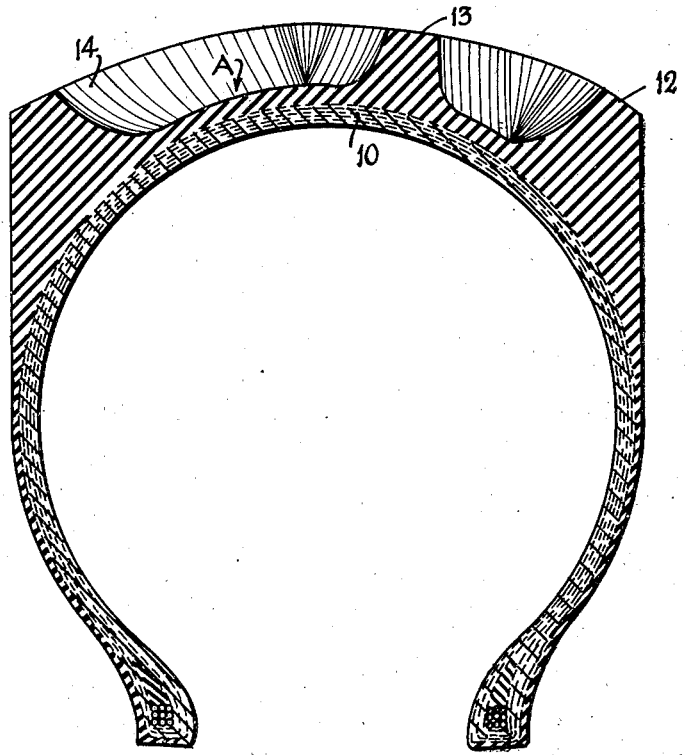
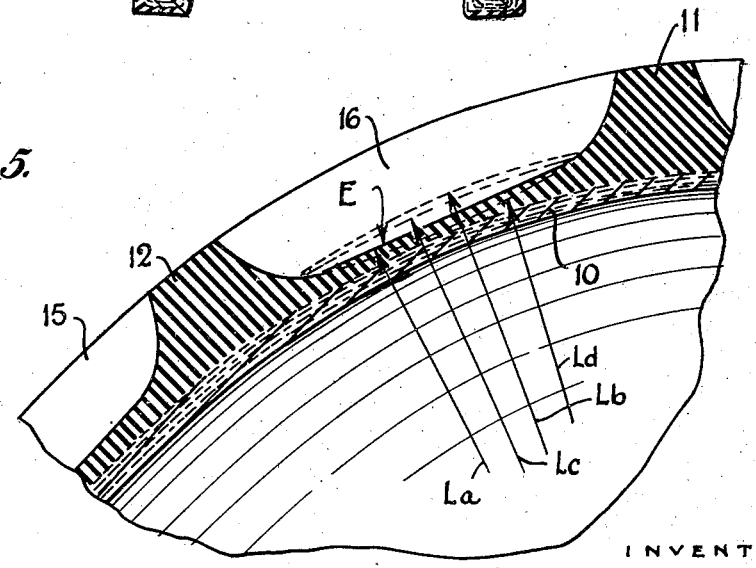
INVENTOR
JOHN G. KREYER, DECEASED
BY HELEN E. KREYER, EXECUTRIX
BY Ely + Frye
ATTORNEYS Feb. 4, 1947.  J. G. KREYER  2,415,291
MOLD FOR TRACTOR TIRES
Original Filed March 12, 1945   4 Sheets-Sheet 4

INVENTOR
JOHN G. KREYER, DECEASED
BY HELEN E. KREYER, EXECUTRIX

BY Ely & Frye
ATTORNEYS

Patented Feb. 4, 1947

2,415,291

UNITED STATES PATENT OFFICE 2,415,291

MOLD FOR TRACTOR TIRES

John G. Kreyer, deceased, late of Akron, Ohio, by Helen E. Kreyer, executrix, Akron, Ohio, assignor to The Firestone Tire & Rubber Company, Akron, Ohio, a corporation of Ohio Original application March 12, 1945, Serial No. 582,366. Divided and this application October 8, 1946, Serial No. 702,038

5 Claims. (Cl. 18—44)

This invention relates to pneumatic tire molds and it refers more particularly to molds for tractor tires whose treads have large, deep, widely spaced traction elements, such, for example, as disclosed in U. S. patents to Clair G. Hoover 2,011,552, James E. Hale 2,113,527, and William S. Coben 2,324,996. Tire tread constructions of this type are used in providing maximum traction in soft soil operations. In such treat constructions or designs the traction elements are in the form of bars with the bar spacing being substantially greater than the bar width or bar height. Heretofore, tractor tires of the type described were designed so that the surface area of the treads between the traction elements was convex in form. Before the present invention, a tire cavity in a tire mold was formed in two boring mill operations, one for sweeping out the base contour of the mold, which is also referred to as the "top line," by those familiar with the art. After the plain cavities were swept out, the necessary recesses, grooves, fillets, etc., for the traction elements were then engraved or cut intaglio in the second operation.

Tires of the class described, vulcanized in molds used heretofore have not been entirely satisfactory and have presented serious problems to the tire industry. Tire engineers and tire production men have sought diligently for a solution to certain faults of said tires, which faults shall be pointed out and discussed hereinafter. However, until the present invention, a solution to the problems had not been found.

Heretofore, that part of the tire ply fabric under the large, deep traction elements of tires of the said Coben type were lifted or drawn toward the traction elements during the tire molding operation. Also the amount of tread rubber adjacent to the base of said elements was undesirably thin and the thickness of the tread rubber in the central area between said elements was of greater thickness than required or desired. In cord tires, cord of uneven stretch causes unequal strains on the fabric cords. Thick rubber between said elements is a waste of rubber and causes the cords of the tire plies to take improper cord direction by pressing the cord ply stock radially inwardly of the tire.

It was discovered that the concave portion of the tire mold surface which formed or molded the convex surface of a tire between the large traction elements actually trapped the rubber therein and did not permit the necessary flow of rubber from the area between, and removed somewhat from the traction elements to fill that part of the mold cavity in which said traction elements were formed; that this resulted in the mold, at the edges of the traction elements, sinking deeply into the rubber of the tire tread leaving an inadequate amount of rubber adjacent to the traction elements, while at the same time the ply fabric of the tire was lifted, or drawn, by the force of the tire curing bag into the traction element portion of the mold cavity. This problem was solved by constructing a tire in which the convexity of the formerly convex surfaces between said traction elements was reduced and in some instances changed to circumferentially substantially flat or concave surfaces, with corresponding flat or convex surfaces in the mold. This was accomplished, as will be understood by those familiar with the art, by radically altering the method of making the tire mold. To make a mold in which a tire embodying the present invention is to be molded, it is necessary to stop the usual boring mill operation at a point where there is still enough metal to scrape or otherwise form circumferentially flat or convex areas between the traction element recesses of the mold. The conception of the invention involved a further valuable contribution to the art, in that by eliminating the convexity of the surface area, as just described, a greater depth of cavity between the traction elements results with no increase in the height of the traction elements. The load carrying characteristics of any given traction element are not affected, but the bottom of the grooves defined by said traction elements of the new tire are removed farther from contact with the road surface, thereby providing longer effective life of the tire.

An object of the invention is to provide a tractor tire mold of such design as will promote the proper flow of tread rubber when a tire is molded therein.

Another object of the invention is to devise a tractor tire mold in which the base contour of the tire molding portion between the traction element grooves is composed of circumferentially flat or convex surfaces.

A further object of the invention is to provide a tractor tire mold having widely spaced, large traction element cavities which mold will not trap tread rubber between said elements in the operation of molding a tire and will accordingly avoid an excess of tread rubber in the base of the tire tread between the tire tread bars or traction elements.

Yet another object of the invention is to provide a mold which will increase the distance between the central portion of the bottom of the groove between tire traction elements and the top line of said traction elements, thereby providing longer effective life to the traction elements for a given quantity of rubber used. Other objects and advantages of the invention will be apparent to those familiar with the art from the following description in connection with the accompanying drawings wherein:

Fig. 2 is a plan view of a portion of the tire shown in Fig. 1;

Fig. 3 is a side elevation of a portion of the tire shown in Fig. 1;

Fig. 4 is a transverse section along line 4—4 of Fig. 2;

Fig. 5 is a longitudinal section taken along line 5—5 of Fig. 2 and indicating by dotted lines various circumferential contours of the bottom surface of tire tread grooves;

The present application is a division of copending application Serial No. 582,366, filed March 12, 1945, by John G. Kreyer.

Figures 1, 6, 7, 10:
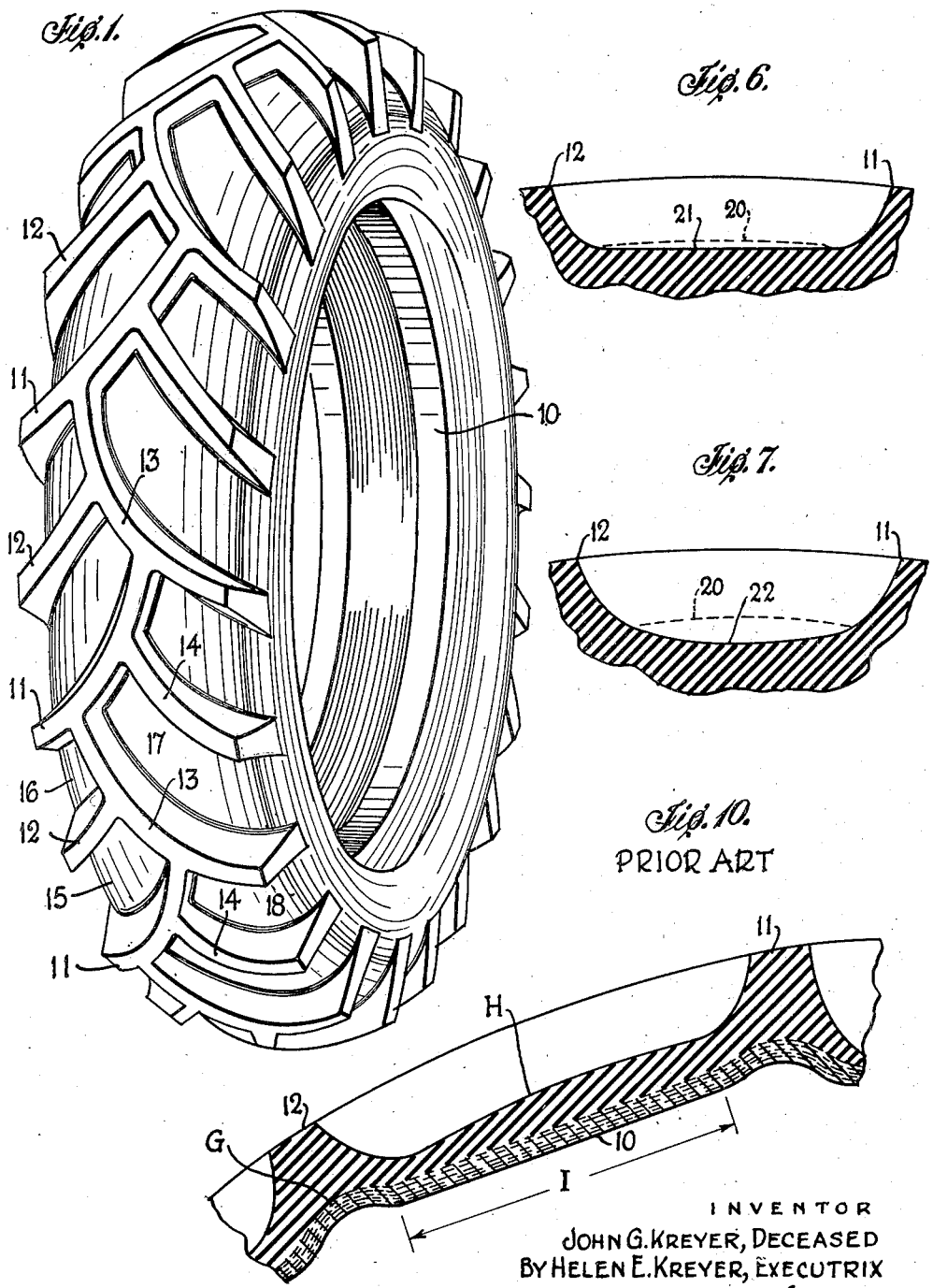
Fig. 1 is a perspective view of a tire made in a mold embodying the invention.
Fig. 6 is a partial circumferential sectional view taken on line 6—6 of Fig. 2 and illustrating the contour of the surface of the tire between the traction elements of the tread of a tire produced in a mold embodying the present invention, the dotted line indicating the contour of such tires before the present invention.
Fig. 7 is the same as Fig. 6 except the contour of the surface of the tire, between the traction elements, is shown as concave rather than flat as shown in Fig. 6.
Fig. 10 is similar to Fig. 5 and illustrates the misplacement of tread rubber and tire fabric as it occurred in the prior art.

Referring now more particularly to the drawings, in Fig. 1 a tire 9, having the usual carcass 10, is shown having large, widely spaced traction elements 11, 12, 13 and 14 defining grooves or cavities 15, 16, 17 and 18 therebetween. By reference to Figs. 4 and 5 it will be seen that the surface of the bottoms of the grooves 15 and 16 are arcuate in contour laterally of the tire as best seen in Fig. 4 but, as shown in Fig. 5, that the contour of the cavities 15 and 16 are flat or straight in circumferential section. It will also be seen by reference to Figs. 4 and 5 that the thickness of rubber at the central area "E" of the cavities 15 and 16 is no greater than the thickness of rubber adjacent to the base of the traction elements 11, 12 and 13.

Referring next to Fig. 6 an arcuate dotted line 20 is shown above a straight line 21. These lines 20 and 21 illustrate the relative circumferential contour of the bottoms of the recesses between the traction elements before and after the present invention, the dotted line 20 representing before, and the line 21 representing after the present invention.

Applicant further found that improvement over the prior art would be obtained if the convex surfaces of the bottoms of the said tread grooves were changed to circumferentially concave surfaces as indicated by the solid surface line 22 of Fig. 7. The dotted line 20 of Fig. 7 represents the usual circumferential convexity of the bottom of said grooves before applicant's invention. It will be understood that the benefits of applicant's invention will be progressively approached as the said circumferential convexity of the bottoms of said grooves approaches a straight or concave line; however, it has been found that in order to correct the faults of tires pointed out hereinabove, the bottoms of said grooves should be at least substantially flat or concave circumferentially of the tire.

Fig. 5 further illustrates a tire molded in a mold embodying the invention by illustrating in one view several of the numerous circumferential contours which the surface of the bottom of grooves may have. Contour identified by line $La$ corresponds to line 21 of Fig. 6, similarly line $Lb$ corresponds to the prior art lines 20 of Figs. 6 and 7, and line $Ld$ corresponds to line 22 of Fig. 7. Line $Lc$ indicates a circumferential groove bottom surface contour only slightly flattened over the prior art. It will now be clear to those familiar with tire design that the central portion of said tread grooves identified by lines $Lc$, $La$ and $Ld$ are in the order just mentioned, closer to the axis of the tire than the central portion of the contour of the prior art identified by line $Lb$. The extent to which the bottoms of the tread grooves will have to be modified over the prior art in the manner indicated above will depend generally on the volume of rubber which must be molded into the tread bars and the distance the rubber moves in molding.

Figure 8:
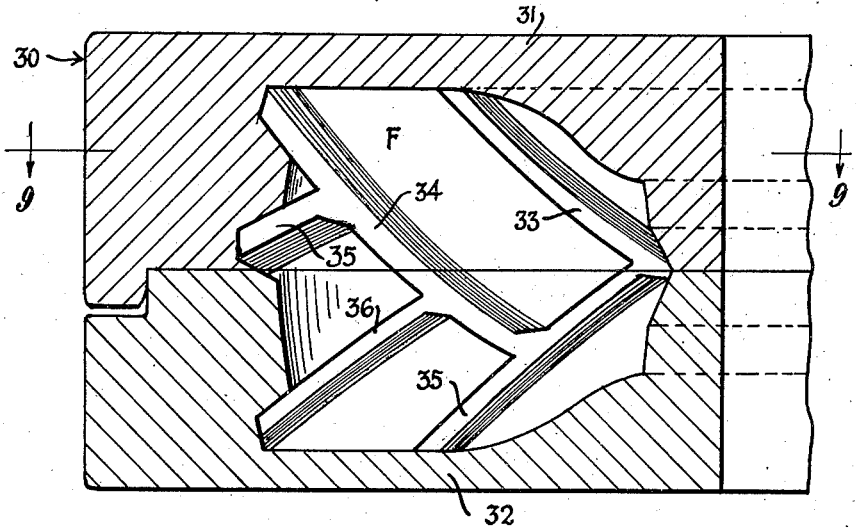
Fig. 8 is a fragmentary sectional view of a tire mold embodying the invention, in which mold the tire shown in Fig. 1 was molded.
Figure 9:
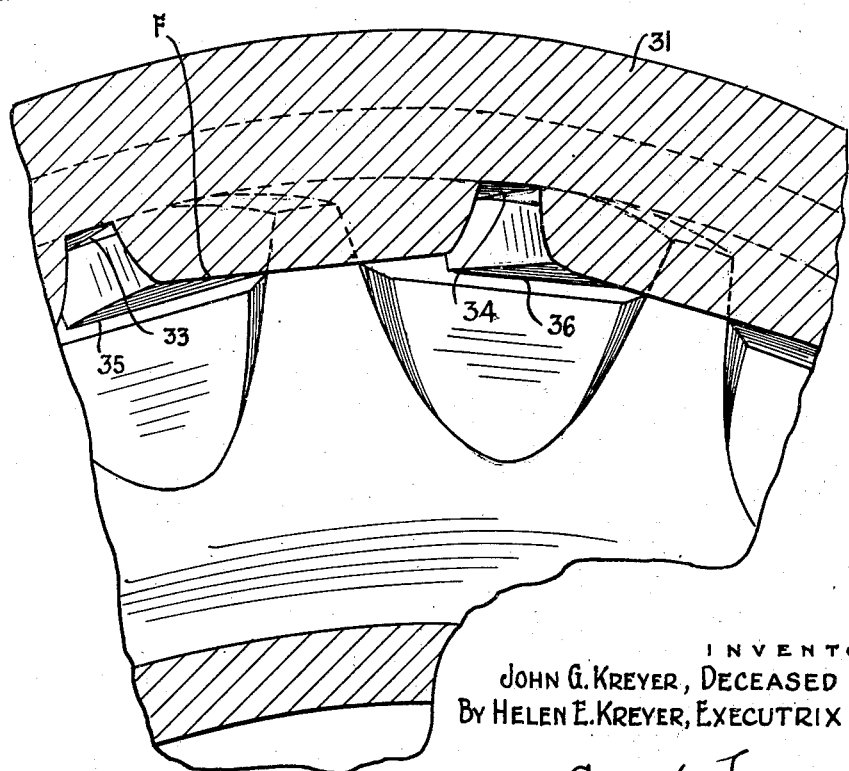
Fig. 9 is a section taken on line 9—9 of Fig. 8.

In Fig. 8 there is shown a fragmentary sectional view of a tire mold 30 of the pot heater type adapted to mold the tire shown in Fig. 1. Said mold comprises the usual top and bottom halves 31 and 32 respectively each provided with a cavity adapted for registry, when the halves are joined, to form the usual tire-receiving mold cavity having side walls and radially inner and outer walls as shown. It will be seen, however, by reference to Fig. 9 that instead of the circumferential contour being the true circle, heretofore used in tire molds, the present mold has a circumferential contour between the traction element cavities of the mold which consists of many sides, which results from forming circumferentially flat areas "F" in the mold between the mold's traction element cavities 33, 34, 35 and 36. The cavities 33, 34, 35 and 36 of the mold shown in Fig. 8 form the traction elements 11, 12, 13 and 14 respectively of the tire shown in Fig. 1. If the bottoms of said recesses 15, 16, 17 and 18 of the tire 9 are to have concave circumferential lines such as, for example, as is shown in Fig. 7, then the surfaces of the mold will be correspondingly convex, as will be understood by those familiar with the art. The method of manufacturing tire molds of the form described above has been briefly discussed in the first paragraph above and the details of the method necessary to manufacture such molds will be obvious to those familiar with machine shop practices.

It will now be seen that applicant has produced a tire mold of a construction that makes possible for the first time in the art the proper molding of a tire of the type described; that he has increased the depth of the cavities between the traction elements of the tread without adversely affecting the stability of said traction elements; that the present invention for the first time makes possible the molding of a tire of the type described without the tire ply fabric lifting into tread traction element cavities of the mold, and also the molding of such tire without an undesirable amount of rubber being trapped in the central areas of the bottoms of the tread cavities defined by the traction elements of the tire tread.

By reference to Figs. 5 and 10 it will be seen by comparison that the improvement in tire construction effected by applicant's invention is a substantial contribution to the art. In Fig. 10, which shows the relative position of the tread rubber and the fabric plies of tires of the type described before the present invention, it will be seen that the ply fabric 10 at "G" is lifted or drawn into the base portions of the traction elements 12 and 11. It will also be seen that there is a greater thickness of tread rubber over the fabric plies at "H" in Fig. 10 than at "E" of Fig. 5, and that the accumulation of tread rubber at "H" together with the flow or lift of ply stock into the traction elements results in a flattened area "I" on the inside of the tire.

Modifications may be resorted to without departing from the spirit of the invention which is to be limited; therefore, only by the prior art and the scope of the appended claims.

What is claimed is:

1. A generally annular tire mold of the character described including a tire receiving cavity having a tread-forming wall provided with a plurality of tread bar channels cut into the surface thereof and spaced in a circumferential direction at distances greater than the width of each channel, said channels defining a circular configuration, the distance between the center of the mold and any point on the surface of said tread-forming wall intermediate the tread bar channels being less than the distance between the center of the mold and the side margins of the tread bar channels at said surface, in a plane perpendicular to the axis of the mold.

2. The mold of claim 1 wherein the surface of the mold intermediate the tread bar channels is substantially linear in a direction circumferentially of the mold, whereby the mold surfaces, intermediate the tread bar channels, define a polygonal configuration.

3. The mold of claim 1 wherein the surface of the the mold intermediate the tread bar channels is convex in the direction circumferentially of the mold.

4. A tire mold provided with a tire receiving cavity formed by radially inner and outer walls and two side walls, the two side walls and radially inner wall being of circular configuration, channels extending into said radially outer wall and communicating with said cavity, said channels being arranged in a circular configuration and being spaced from each other at distances greater than the width of each channel, the surfaces of said radially outer wall between said channels having a curvature of a radius greater than the distance between any point on said surface and the center of the mold.

5. A generally annular tire mold of the character described including a tire-receiving cavity having a tread-forming wall provided with a plurality of tread bar channels cut into the surface thereof, each tread bar channel being defined by a bottom wall and opposed side walls merging at their radially inner edges with said tread-forming wall, said tread bar channels being spaced apart in a direction circumferentially of the mold a distance greater than the width of said channels, the distance between the axis of said mold and any point on the surface of said tread-forming wall intermediate any two adjacent tread bar channels measured in a circumferential plane perpendicular to the axis of said mold being less than the distance between the axis of said mold and the point of merger of said side walls of said tread bar channels with said surface of said tread-forming wall.

HELEN E. KREYER,
Executrix of the Estate of John G. Kreyer, Deceased.

REFERENCES CITED

The following references are of record in the file of this patent:

UNITED STATES PATENTS

| Number | Name | Date |
| --- | --- | --- |
| 2,339,541 | Bosomworth et al. | Jan. 18, 1944 |